Nov. 26, 1968     H. RUBE     3,413,060

SLIDE PROJECTOR WITH SHUTTER

Filed May 2, 1966     5 Sheets-Sheet 1

INVENTOR:
HELMUT RUBE

BY Michael S. Striker
his ATTORNEY

United States Patent Office 3,413,060
Patented Nov. 26, 1968

3,413,060
SLIDE PROJECTOR WITH SHUTTER
Helmut Rube, Endersbach, Germany, assignor to Robert Bosch Elektronik und Photokino G.m.b.H., Stuttgart-Unterturkheim, Germany
Filed May 2, 1966, Ser. No. 546,892
Claims priority, application Germany, May 3, 1965, B 81,715
20 Claims. (Cl. 353—21)

The present invention relates to slide projectors in general, and more particularly to improvements in slide projectors of the type wherein a manually or motorically operated transfer unit transports slides seriatim between a movable slide magazine or tray and the projection gate.

In showing to his audience a series of slides which are stored in a magazine, the operator of a slide projector often wishes to skip a certain slide or a certain group of slides. This might be desirable for a number of reasons, for example, because a certain slide is not very satisfactory and is intended only for observation by the person who took the pictures, because the events attendant the taking of a certain picture are of strictly personal nature and should not be revealed to strangers, or because the operator notes that a certain slide or a certain group of slides has been inserted out of order, i.e., that the images on such slide or slides have no relationship with the images on the remaining slides which are stored in the same magazine.

Presently known slide projectors are not constructed with a view to allow for selective bypassing of one or more slides which are already accommodated in a slide magazine. Thus, and in order to make sure that such slide or slides will not be shown to the audience, the operator must examine the contents of a loaded magazine and must pick out all such slides which he wishes to omit. This is a tedious and time-consuming task, in addition to the fact that the decision not to show (or to show) a certain slide or a certain group of slides might be arrived at in the course of the actual projection of slides in a given magazine. Furthermore, and if the operator simply removes a few slides from the magazine and intends to return them into their respective compartments when the presentation of the respective series of images is completed, the audience is often annoyed or inconvenienced by the strong beam of light which impinges on the viewing screen whenever the projector runs "blind," i.e., whenever the transfer unit registers with an empty compartment of the slide magazine.

Accordingly, it is an important object of the present invention to provide a novel and improved slide projector which is constructed and assembled in such a way that the operator is always in a position to skip the presentation of a selected slide or a selected group of slides despite the fact that such slides are accommodated in the magazine which is inserted into or attached to the housing of the slide projector.

Another object of the invention is to provide a slide projector of the just outlined characteristics wherein the additional mechanism which enables the operator to skip one or more slides adds little to the bulk and/or complicatedness of the projector.

A further object of the invention is to provide a slide projector wherein the light beam is automatically blanked from the viewing screen when the operator decides to skip a slide so that the audience is not annoyed or inconvenienced by light coming from the projection lamp when there is no picture on the viewing screen.

An additional object of the invention is to provide a slide projector with a very simple shutter which can perform a number of important functions, such as obstructing from view one or more slides which the operator does not wish to show, as well as shielding the eyes of the audience from the light beam when there is no picture on the viewing screen.

Still another object of the instant invention is to provide the slide projector with a very simple previewer which enables the operator to observe, only for himself, each such slide which is about to be moved into the projection gate, so that the operator can decide on the spot whether or not he wishes to actually show a slide to his audience.

A concomitant object of the invention is to provide a novel transfer unit which can transport slides between the magazine and the projection gate and which can also perform a number of additional important functions, particularly in connection with transfer of slides into the previewer and in connection with operation of the shutter.

A further object of the present invention is to provide a slide projector which is very simple and easy to operate, whose manipulation can be entrusted to persons having little technical skill, and wherein the transfer of slides can be carried out by hand or by means of a motor.

Another object of the invention is to provide a slide projector wherein the magazine is transported in automatic response to manipulation of the transfer unit which transports slides between the magazine and the projection gate.

Briefly stated, one feature of the present invention resides in the provision of a slide projector which comprises a housing, a projection gate provided in the housing behind the projection lens, a transfer unit for transporting slides between a magazine (which is mounted on or in the housing) and the projection gate, a shutter movable between open and closed positions and normally assuming its closed position to thereby blank the light beam from the viewing screen (i.e., to normally prevent light issuing from the projection lamp and passing through the projection gate from reaching the viewing screen) when there is no slide in the projection gate, motion transmitting means normally cooperating with the transfer unit for moving the shutter to open position in response to transfer of a slide into the projection gate, and control means for selectively idling the motion transmitting means (i.e., for preventing opening of the shutter) so that the shutter remains closed while the transfer unit transports at least one slide into the projection gate. The shutter may comprise a single shutter blade which is rockable on a fixed pin or shaft and which is permanently biased to closed position by a torsion spring or the like.

The transfer unit preferably comprises a transfer member which may resemble a pusher and is movable between two end positions. The motion transmitting means may comprise a motion transmitting member provided on the transfer member and movable with respect thereto between first and second positions in one of which the motion transmitting member engages a follower stud or an analogous portion of the shutter to move the latter to open position while the transfer member moves from the one to the other end position to thereby transport a slide from the magazine into the projection gate. The motion transmitting member is arranged to bypass the follower of the shutter in the other of its positions relative to the transfer member, and the control means may comprise a device which can displace the motion transmitting member to such other position (against the bias of a suitable spring) at the will of the operator.

The novel features which are considered as characteristic of the invention are set forth in particular in the appended claims. The improved slide projector itself, however, both as to its construction and its mode of operation, together with additional features and advantages thereof, will be best understood upon perusal of the following detailed description of a specific embodiment with reference to the accompanying drawings, in which:

Figure 1:
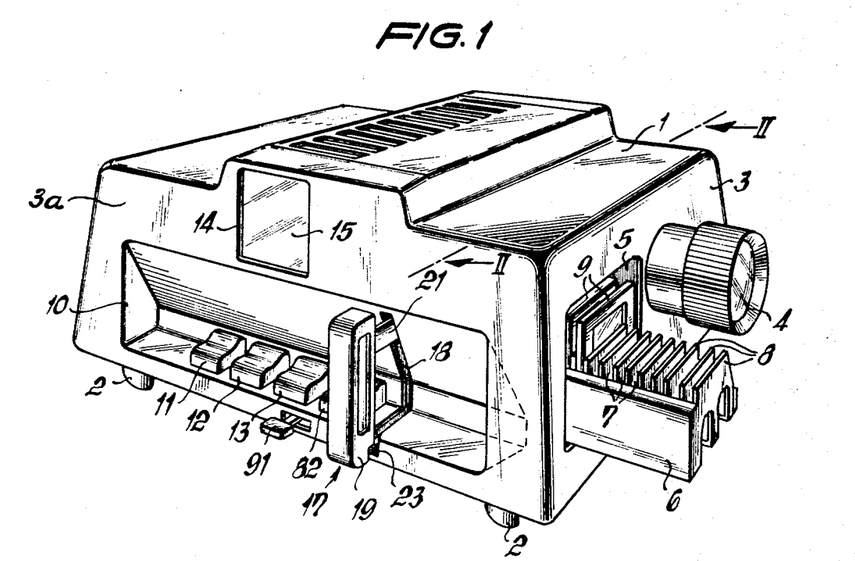
FIG. 1 is a perspective view of a slide projector which embodies the shutter of my present invention.

Referring to the drawings in detail, and first to FIG. 1, there is shown a slide projector which comprises a housing 1 resting on four legs 2 and having a front wall 3 which carries a projector lens 4. The housing 1 is provided with a tunnel or passage 5 which is parallel to the optical axis of the lens 4 and accommodates a magazine or tray 6 for a series of slides 9. Each slide rests in a separate compartment 7 and such compartments are separated from each other by vertical partitions 8 located in planes which are normal to the longitudinal direction of the tunnel 5. The magazine 6 is insertable from the rear end of the tunnel 5 and is movable in stepwise fashion by an advancing mechanism which will be described later.

A side wall 3a of the housing 1 is formed with an elongated recess or depression 10 which accommodates the controls of the projector including a row of three pushbuttons 11, 12 and 13. The pushbuttons 11, 12 and 13 may be used to open or complete the circuit of a projection lamp (not shown), to start or arrest a motor-driven fan (not shown), and to complete or open the circuit of a motor (not shown) which can effect automatic transfer of slides 9 between the magazine 6 and a projection gate PG indicated in FIG. 3. The top portion of the side wall 3a is formed with a window 14 which accommodates a frosted screen 15 forming part of a slide previewer which will be described later. The purpose of the previewer is to enable the operator of the projector to observe a slide just before the slide is transported into the projection gate PG so that the operator can gather his thoughts pertaining to the events accompanying taking of the respective picture or pertaining to the image on such slide, and also that the operator can decide whether or not he actually wishes to show the slide to his audience. It will be noted that the window 14 for the screen 15 faces away from the viewing screen onto which the lens 4 projects images of slides which are inserted into the projection gate.

Figure 2:
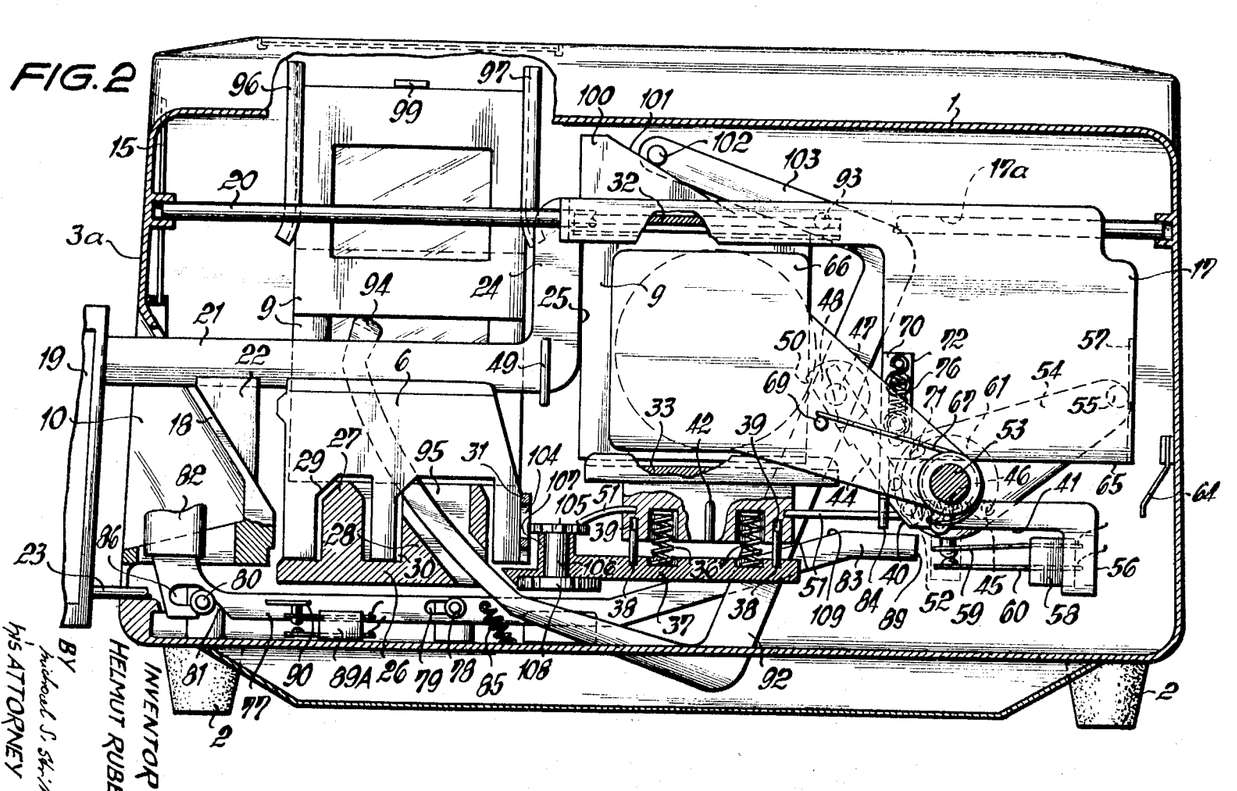
FIG. 2 is an enlarged transverse vertical section substantially as seen in the direction of arrows from the line II—II of FIG. 1, the slide transfer unit being shown in an intermediate position and the shutter being shown in closed position.
Figure 4:
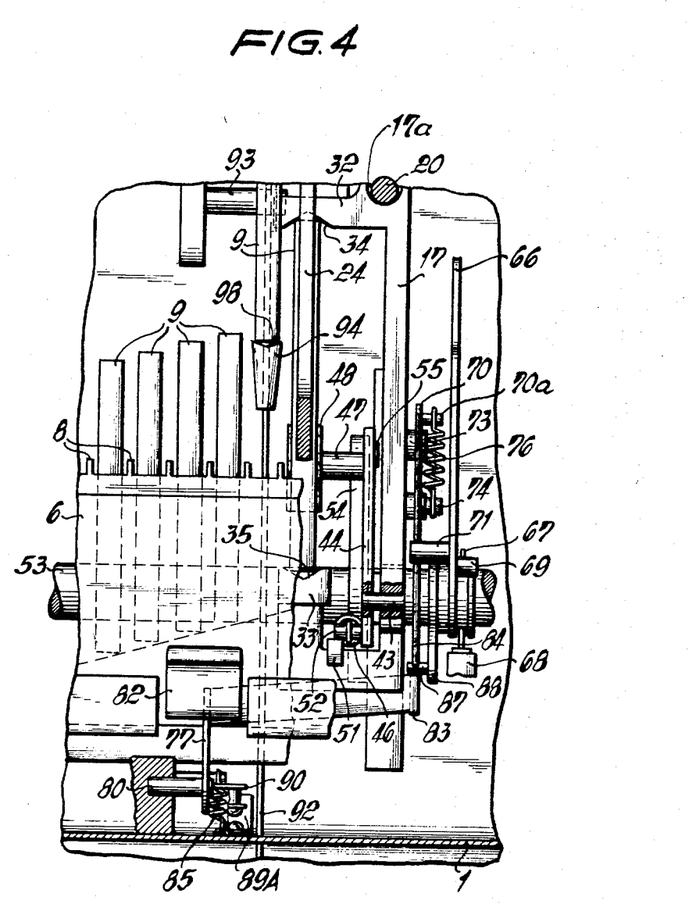
FIG. 4 is a vertical section substantially as seen in the direction of arrows from the line IV—IV of FIG. 3.

The transfer unit which transports slides between the magazine 6 and the projection gate PG comprises a transfer member here shown as a pusher 17 which is movable back and forth in a horizontal path disposed in a vertical plane extending across the tunnel 5 and at right angles to the optical axis. The pusher 17 extends into a slot 18 provided in the side wall 3a and is coupled or rigidly secured to a handle 19 which can be pushed or pulled by hand. As shown in FIGS. 2 and 4, the pusher 17 has a horizontal bore 17a which receives a portion of a horizontal guide rod 20 secured to the two side walls of the housing 1 and serving to guide the pusher between its end positions. An arm 21 of the pusher 17 is guided in a fixed guide member 22 (see FIG. 2) to prevent tilting of the pusher, and the latter is also provided with a second arm 23 which is connected with the handle 19 and is guided in a suitable channel or groove of the side wall 3a.

Figure 3:
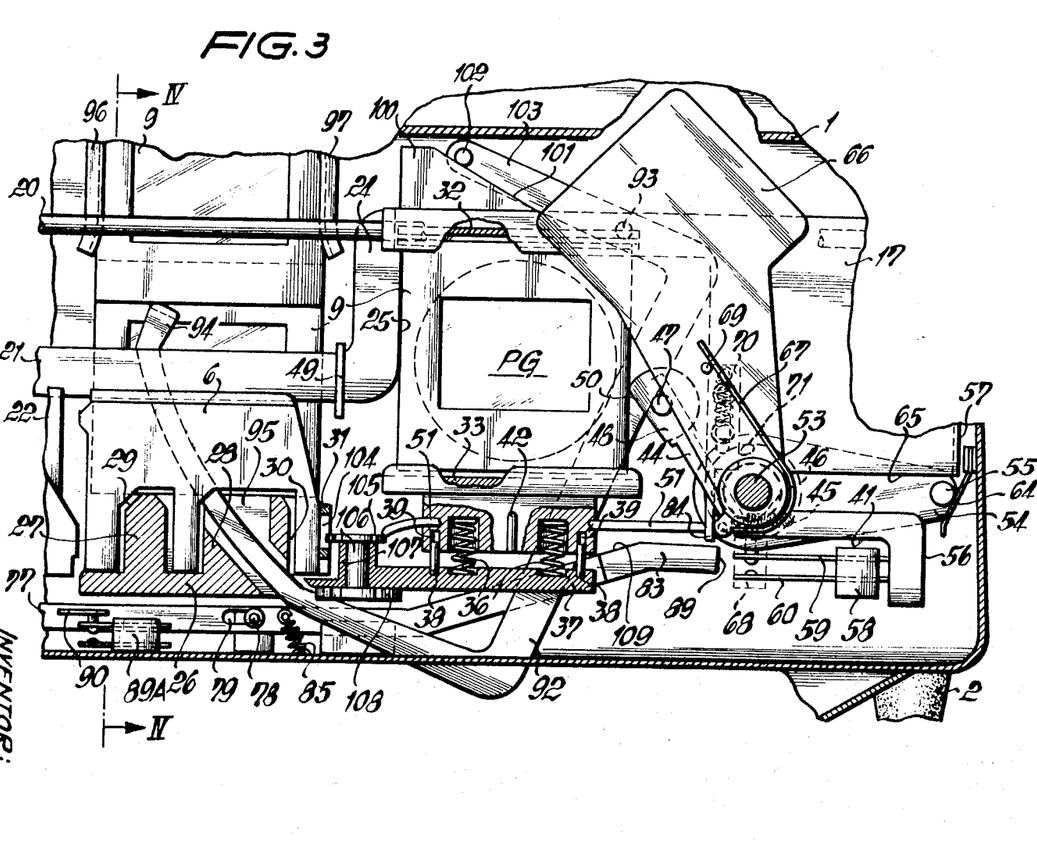
FIG. 3 is a similar section and illustrates the shutter in open position, the slide transfer unit being shown in an end position.

The arms 21, 23 constitute the outermost portion of the pusher 17 and the inner end of the arm 21 is integral with an upwardly extending intermediate portion 24 having a vertical or nearly vertical edge face 25 which serves as a means for transmitting motion to a slide 9 when the pusher is shifted from the non-illustrated first end position toward the end position of FIG. 3. The lower part of the tunnel 5 is bounded by a bottom wall 26 which is provided with two gradually rising inclinations or ramps 27, 28 serving to lift in the magazine 6 that slide 9 which happens to register with the edge face 25. The height of the ramps 27, 28 suffices to move the lower edge on the frame of such slide to a level slightly above the upper edge of a side wall 31 forming part of the magazine 6. It will be noted that each of the ramps 27, 28 slopes in opposite directions from its actual crest and that these ramps respectively extend into channels 29, 30 provided in the underside of the magazine 6. Thus, a slide whose frame rests on the crests of the ramps 27, 28 can be simply pushed by the edge face 25 and then leaves the respective compartment 7 to advance in a direction toward the projection gate PG, i.e., to a position in which it extends across the optical axis and is ready to have its image projected onto a viewing screen.

FIGS. 2 to 4 show that the pusher 17 comprises an elongated clamping rail 32 which can cooperate with a second or lower clamping rail 33 to hold a slide in requisite position when the slide has been transported into the projection gate PG. The clamping rails 32, 33 are respectively formed with elongated V-shaped channels 34, 35 each of which can receive the respective edge on the frame of a slide which has been moved into the projection gate PG. Due to the provision of channels 34, 35, the clamping rails 32, 33 engage the corresponding edges of the slide frame not unlike a pair of roof sections and can hold the slide in optimum position for projection of its image, i.e., in a position in which the plane of the slide is exactly normal to the optical axis and is accurately centered in the projection gate.

The lower clamping rail 33 is biased upwardly by a pair of helical expansion springs 36 which rest on a fixed bottom plate 37 carried by the housing 1. The plate 37 has two vertical guide pins 38 which extend into complementary guide bores 39 of the clamping rail 33 so that the later can move up and down and is permanently biased in a direction toward the upper clamping rail 32.

The means for depressing the clamping rail 33 against the bias of the springs 36 comprises cams 40, 41 on the pusher 17 each of which can engage a follower stud 42 on the rail 33. The purpose of the cams 40, 41 and stud 42 is to lower the rail 33 to a level at which the channel 35 registers with the lower edge on the frame of that slide 9 which rests on the crests of the ramps 27, 28 so that, while moving in a direction toward the position of FIG. 3, the edge face 25 of the member 17 can simply push the slide onto the lower clamping rail 33.

The pusher 17 carries a horizontal pivot pin 43 (see FIG. 4) for a return lever 44 whose purpose is to shift slides 9 from the projection gate PG back into the alloted compartments 7 in the magazine 6. The return lever 44 is biased by a helical spring 46 one end of which is attached to a post 45 on the pusher. The upwardly extending arm of the lever 44 carries a pin 47 for a motion transmitting head 48 which can come in direct contact with the frame of a slide in the projection gate PG. The operation of the head 48 is such that it cannot interfere with the forward or reverse movement of the magazine 6 in its tunnel 5 and, to this end, the head 48 comprises a flat facet 50 and the housing 1 accommodates a fixed stop 49 which can engage the pin 47 when the facet 50 has returned a slide all the way into the respective compartment 7 of the magazine 6. When the facet 50 is about to return a slide from the gate PG, its plane is inclined with reference to the adjoining vertical edge on the frame of the slide (see FIG. 2 or 3). However, when the facet 50 has returned the slide into its compartment 7, the stop 49 engages the pin 47 and prevents further leftward movement of the head 48. The pusher 17 then performs the last stage of its leftward movement in order to effect stepwise advance of the magazine 6, and such movement of the pusher enables the return lever 44 to rock in a clockwise direction, as viewed in FIG. 2 or 3, and to move the facet 50 away from the adjoining edge on the side frame which has been returned to its compartment so that the head 48 is out of the way and cannot interfere with displacement of the magazine. In such ineffective position, the facet 50 is substantially parallel with the vertical edges on the frames of slides which are accommodated in the magazine. The housing 1 carries a guide rail 51 which cooperates with a follower 52 on the return lever 44 to hold the latter in a position in which the facet 50 is inclined to the extent shown in FIGS. 2 and 3. When the pusher 17 approaches the last stage of its leftward movement, the follower 52 moves beyond the guide rail 51 and the pin 47 engages the stop 49 so as to place the facet 50 against the bias of the spring 46 into a vertical plane and to simultaneously move the head 48 away from the nearest slide. The follower 52 simultaneously serves as a post to hold the other end of the spring 46.

Instead of manipulating the pusher 17 through the intermediary of the handle 19, the operator can start the motor which is controlled by the push button 13 to thereby move the pusher 17 back and forth in order to transport slides between consecutive compartments 7 and the projection gate PG. The motor is represented by its output shaft 53 which is journalled in the housing 1 and carries a crank arm 54 for a crank pin 55. This crank pin can orbit about the axis of the output shaft 53 (in a clockwise direction, as viewed in FIG. 2 or 3) in order to alternately engage a vertical edge 56 and a bent-over flange 57 of the pusher 17. When it engages the edge 56, the crank pin 55 can shift the pusher 17 to the left of the end position shown in FIG. 3. On the other hand, by rotating in a clockwise direction and by engaging the flange 57, the pin 55 can shift the pusher 17 to the position of FIG. 2 and beyond, namely, to the end position of FIG. 3 in which the pusher has reached the right-hand end of its stroke and the flange 57 is already disengaged from the pin 55. FIG. 3 shows the crank pin 55 in a position of rest when the motor is idle and when the pin 55 is in engagement with a springy brake 64 carried by the housing 1. In such a position, the pin 55 registers with an elongated horizontal slot 65 of the pusher 17 which enables the handle 19 to move the pusher back and forth as soon as the motor which can drive the output shaft 53 is brought to a halt. In other words, the motor for the shaft 53 is invariably arrested in a position of the crank arm 54 when the pin 55 engages the brake 64 so that a slide remains in the projection gate PG. By thereupon restarting the motor through the intermediary of the push button 13, the operator first causes the lever 44 to return the slide from the gate into the magazine 6, to then advance the magazine by a step, and to thereupon shift a fresh slide from the magazine into the gate. Referring to FIG. 3, this means that the pin 55 first engages the vertical edge 56 to effect return movement of a slide from the projection gate PG, and that the pin 55 thereupon engages the flange 57 in order to transfer a fresh slide into the projection gate.

The electric circuit of the motor for the output shaft 53 comprises a normally open switch 58 having two elastic contacts 59 and 60. This switch 58 may be closed by a disk-shaped trip 61 (see FIG. 6) which is fixed to the shaft 53. The peripheral face of the trip 61 has a notch 62 which can receive a pin 63 on the upper contact 59. When the crank pin 55 engages the brake 64, the pin 63 extends into the notch 62 and the switch 58 is open to deenergize the circuit of the motor for the shaft 53. The switch 58 is connected in parallel with a second switch (not shown) which can be temporarily closed by the push button 13. When this second switch is closed, it completes the motor circuit so that the angular position of the output shaft 53 and trip 61 changes whereby the latter expels the pin 63 from its notch 62 and the switch 58 closes to complete the circuit of the motor even if the push button 13 is released. The circuit remains completed for a full revolution of the shaft 53 and opens again when the pin 63 reenters the notch 62.

Figure 5:
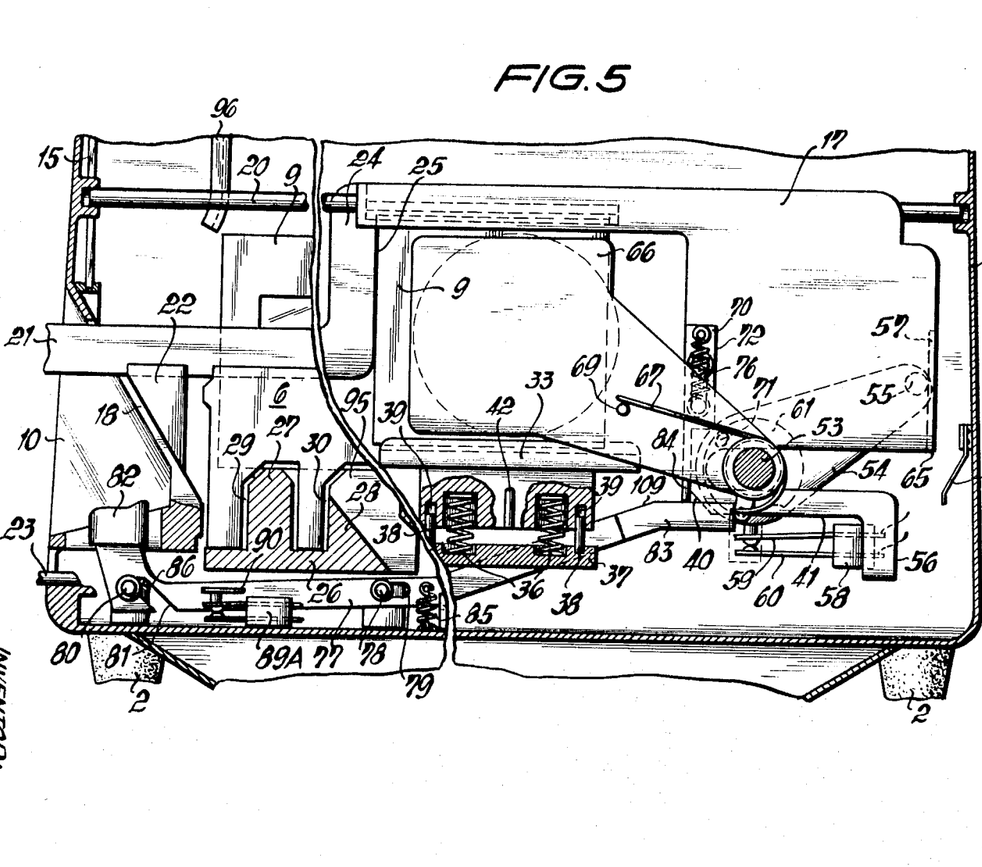
FIG. 5 is an enlarged fragmentary detail view of the structure shown in FIG. 2 or 3 and illustrates the construction of the control device which can effect that the shutter remains in closed position.

The output shaft 53 further carries a loosely mounted disk-shaped shutter blade 66 whose purpose is to blank out the light beam during intervals when the pusher 17 transports slides between the gate PG and the magazine 6. The shutter blade 66 is biased by a torsion spring 67 which tends to maintain it in the closed position shown in FIGS. 2, 5 and 6. The spring 67 is mounted on a fixed post 68 and its free leg bears against a pin-shaped projection 69 of the shutter blade 66.

Figure 6:
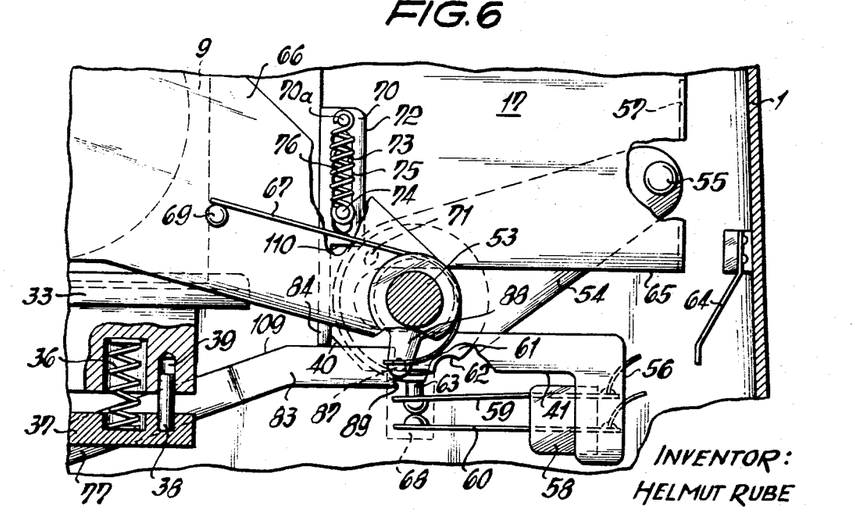
FIG. 6 is a greatly enlarged view of a detail of the structure shown in FIG. 5 and illustrates the mounting of the motion transmitting member for the shutter.

FIG. 6 shows that the pusher 17 carries a motion transmitting member 70 which can cooperate with a follower stud 71 of the shutter blade 66. An edge 72 on the member 70 reaches the follower stud 71 when the pusher 17 approaches the right-hand end position whereby the pusher begins to rock the shutter blade 66 against the bias of the torsion spring 67 and ultimately places the shutter blade into the open or ineffective position of FIG. 3. The blade 66 reaches such open position when a fresh slide 9 is almost completely accommodated in the projection gate PG. The motion transmitting member 70 is mounted on the pusher 17 by means of a pin-and-slot connection 73–75 shown in FIG. 6 and is displaceable up and down, namely, in a direction at right angles to the direction of movement of the pusher. A spring 76 which is connected to the pin 74 and to a further pin 70a of the motion transmitting member 70 biases the latter to a first position in which the member 70 can engage the follower stud 71 of the shutter blade 66, such position being shown in FIGS. 2 and 3.

The projector further comprises a manually operable control device which can move the motion transmitting member 70 into a second position wherein the latter bypasses the follower stud 71 so that the shutter blade 66 then remains in closed position and continues to blank the light beam from the viewing screen. This control device includes a slide member or carriage 77 which is located at a level below the bottom wall 26 for the tunnel 5 and is guided by pins 78, 80 and slots 79, 81 in such a way that it can reciprocate and is also tiltable about the pin 78. One end portion of the slide member 77 is connected with a manually operable push button 82 (see also FIG. 1) which extends into the recess 10. The other end portion 83 of the slide member 77 is bent and cooperates with an extension 84 of the motion transmitting member 70. A spring 85 biases the slide member 77 to the initial position of FIG. 2 or 3; in such position of the slide member 77, its end portion 83 cannot influence the motion transmitting member 70. If the push button 82 is depressed, the slide member 77 is compelled to move to the position of FIG. 5 whereby its end portion 83 engages the extension 84 and lifts the motion transmitting member 70 against the bias of the spring 76 to such an extent that, when the pusher 17 again travels toward the right-hand end position of FIG. 3, the edge 72 of the member 70 bypasses the follower stud 71 and the shutter blade 66 remains in closed position. The blade 66 then remains in such closed position until the operator allows the spring 76 to return the motion transmitting member 70 to its lower end position in which the edge 72 can engage the follower stud 71. In order to make sure that the shutter blade 66 is not caused to open before the operator of the projector so desires, the projector is provided with a locking or retaining device which can hold the motion transmitting member 70 in the upper end position. In the illustrated embodiment, the slide member 77 forms part of such locking device in that the slot 81 for the pin 80 comprises a horizontal portion or extension 86 (see FIG. 5) which can receive the pin 80 when the push button 82 is depressed. This locking device can be disengaged in a fully automatic way in response to operation of the motor for the output shaft 53. The shaft 53 carries an arm 88 for a releasing pin 87 (see FIGS. 4 and 6) which can strike against an edge face 89 of the slide member 77 just before the pusher 17 reaches the right-hand end position. The releasing pin 87 then enables the spring 85 to return the slide member 77 to its inoperative position.

The circuit of the motor 53 comprises the switch 58, the aforementioned second switch (not shown) which can be closed in response to depression of the push button 13, and a third switch 89A which is connected in parallel with the second switch. This third switch 89A can be closed by a trip 90 formed as a projection of the slide member 77 when the operator depresses the push button 82. If the operator decides that he will not show to his audience that slide which registers with the edge face 25 of the pusher 17 (i.e., that slide which has been returned from the previewer), he can start the motor for the output shaft 53 by depressing the push button 82, instead of depressing the push button 13. When operating the pusher 17 by means of the handle 19, the operator must withdraw the push button 82 to return the slide member 77 to its initial position. In order to avoid that such manual operation will start the motor for the shaft 53 when the push button 82 is depressed by the operator for the purpose of preventing projection of the image on a given slide, the circuit of the motor for the shaft 53 includes an interrupter switch (not shown) which can be operated by a lever 91 (see FIG. 1) to make sure that the motor is not started when the pusher 17 is operated by hand.

The slides 9 which are stored in the magazine 6 are automatically introduced into the previewer before they can reach the projection gate PG. The previewer comprises the aforementioned window 14 for the screen 15 in the side wall 3a at a level above the recess 10. The previewer further comprises a source of light, a condenser lens and a deflecting mirror, not shown. Reference may be had to my copending application Ser. No. 545,377, filed Apr. 6, 1966, and now abandoned, which is entitled "Slide Projector" and deals specifically with the construction and operation of the slide previewer.

The transfer unit which transports slides from the magazine 6 into the previewer comprises a transfer member in the form of a rockable sickle-shaped lever 92 (hereinafter called lifter for short) which is best shown in FIGS. 2 to 4. The purpose of this lifter is to place into the previewer that slide which is immediately adjacent to the slide in registry with the edge face 25 of the pusher 17. In other words, the previewer will allow for observation of that slide which is next in line for transfer into the projection gate PG when the magazine 6 is caused to advance forwardly, namely, in a direction toward and beyond the front wall 3 of the housing 1. The lifter 92 is rockable on a fixed horizontal pin 93 which is parallel with the longitudinal direction of the tunnel 5. The lower end portion 94 of the lifter 92 resembles a plunger and is movable upwardly through a cutout 95 in the bottom wall 26 to enter the magazine 6 from below and to lift a slide from its compartment into the space between a pair of guide rails 96 and 97 located directly above the tunnel 5 and serving to hold the slide in such position that the aforementioned deflecting mirror will project its image onto the screen 15. Reference may be had again to my aforementioned copending application which deals specifically with the slide previewer. The plane in which the raised plunger 94 of the lifter 92 holds a slide in the previewer is parallel to the plane of the slide in the projection gate PG and is separated therefrom by a distance corresponding to that between two adjoining slides in the magazine 6. The upper end face of the plunger 94 is formed with a V-shaped channel 98 (see FIG. 4) which can receive the lower edge on the frame of that slide which is being lifted into the space between the guide rails 96 and 97. When a slide rises in response to rocking of the lifter 72, the upper edge of its frame engages and deforms the forward end of a leaf spring 99 (see FIG. 2) which extends between the guide rails 96, 97 and serves to automatically return the slide from the previewer when the lifter 92 descends.

The means for rocking the lifter 92 comprises a substantially wedge-shaped motion transmitting cam 100 which is fixed to the pusher 17 and whose suitably inclined cam face 101 can engage a follower pin 102 provided on the short upper arm 103 of the lifter 92. The cam face 101 will engage the pin 102 to rock the lifter 92 in a clockwise direction and to thereby raise the plunger 94 into the tunnel 5 when the pusher 17 moves toward the end position of FIG. 3. When the pusher 17 is being withdrawn by moving in a direction to the left, as viewed in FIG. 3, the lifter 92 rocks in a counterclockwise direction, not only by gravity but also under the weight of the slide between the guide rails 96, 97 and under the bias of the spring 99.

Each compartment 7 of the magazine 6 registers with an opening 104 which is provided in the side wall 31. These openings may receive the teeth of an advancing gear 105 which is mounted on a vertical shaft 106. The shaft 106 is rotatable in a sleeve 107 provided on the bottom plate 37 and carries an indexing wheel 108 located at a level below the plate 37. The wheel 108 may be rotated through angles of desired magnitude by a pin (not shown) which is coupled to the pusher 17 and engages the wheel 108 when the pusher 17 performs the last stage of its movement toward the left-hand end position. In other words, the pusher 17 will rotate the wheel 108 (and hence the gear 105) in order to advance the magazine 6 by a step when a slide which was originally located in the projection gate PG has been properly returned into the corresponding compartment 7 of the magazine 6. Reference may be had again to my aforementioned copending application entitled "Slide Projector" wherein the advancing mechanism for the magazine 6 is described in full detail. The advancing mechanism is preferably constructed and assembled in such a way that the magazine 6 may be advanced forwardly or backwards, i.e., that the operator can go back to a selected slide in order to show it for a second time.

The operation of the projector is as follows:

In order to set up the projector, the operator will insert a loaded magazine 6 by introducing the magazine through the rear end of the tunnel 5 and to such an extent that the foremost slide 9 (or a selected slide) registers with the edge face 25 of the pusher 17. The latter is assumed to be held in its left-hand end position in which the edge face 25 is located to the left of the tunnel 5, as viewed in FIG. 2 or 3. The operator also depresses the push buttons 11 and 12 to respectively complete the circiut of the projection lamp and to start the fan. The lamp of the previewer may be lighted up in response to depression of the push button 11 or 12. The lever 91 is set for manual or motoric operation of the pusher 17.

This completes the preparatory steps and the pusher 17 is ready to transport a first slide from the aligned compartment 7 into the projection gate PG in response to its movement from the aforementioned left-hand end position to the right-hand end position of FIG. 3. During such movement of the pusher 17, the edge face 25 shifts that slide whose frame rests on the crests of the ramps 27, 28 and the edge face 25 advances such slide over the side wall 31 of the magazine and into the channel 35 of the lower clamping rail 33 which is then depressed because its follower stud 42 is engaged by the cam 41 of the travelling pusher 17. When the stud 42 is released, the springs 36 are free to expand and urge the lower clamping rail 33 upwardly so that a slide which has entered the projection gate PG is safely held between the rails 32 and 33.

As the pusher 17 moves toward the end position of FIG. 3, the inclined face 101 of its cam 100 engages the follower 102 and rocks the lifter 92 in a clockwise direction to raise the plunger 94 whereby the latter rises into the tunnel 5 and lifts the aligned slide into the space between the guide rails 96 and 97. The thus lifted slide biases the spring 99 and its image is visible on the screen 15.

Shortly before the pusher 17 actually reaches the end position of FIG. 3, the edge 72 of the motion transmitting member 70 engages the follower stud 71 and rocks the shutter blade 66 against the bias of the spring 67 so that the blade 66 moves to the open position of FIG. 3. The image of the slide in the projection gate PG is now projected onto the viewing screen, not shown, which is placed in front of the projector lens 4.

If the pusher 17 was shifted to the end position of FIG. 3 in response to depression of the push button 13, it comes to a halt as soon as a slide is properly received in the gate PG because the pin 63 of the movable switch contact 59 then enters the notch 62 of the trip 61 on the output shaft 53. In other words, and in order to return the slide into the magazine, the operator must again depress the push button 13 or exerts a pull upon the handle 19. Shortly after the pusher 17 leaves the end position of FIG. 3, the edge 72 of the motion transmitting member 70 releases the follower stud 71 of the shutter blade 66 so that the latter can follow the bias of the spring 67 and returns to closed poistion whereby the audience cannot observe the return movement of slides into the magazine 6. The slides are pushed back into the magazine by the head 48 of the return lever 44 while the follower 52 of the lever 44 slides along the guide rail 51 to maintain the facet 50 on the head 48 in inclined position. Shortly before the slide moves beyond the spring-biased lower clamping rail 33, the cam 40 of the pusher 17 engages the follower stud 42 and depresses the rail 33 against the bias of the springs 36 so that the lower channel 35 descends and moves away from the channel 34 of the upper clamping rail 32. The rail 33 then remains in depressed position because the cam 41 of the pusher 17 continues to engage the stud 42.

Once the head 48 has completed the transfer of a slide back into the magazine 6, the follower 52 moves beyond the guide rail 51. At the same time, the pin 47 strikes against the stop 49, so that the lever 44 rocks about the pivot pin 43 against the bias of the spring 46 until the facet 50 assumes a vertical position and the head 48 is sufficiently spaced from the magazine 6 to be out of the way, i.e., that the magazine can be advanced by a step in response to the last stage of movement of the pusher 17 to its left-hand end position. The advancing mechanism for the magazine 6 comprises the aforementioned gear 105 and the indexing wheel 108 which is turned by the pusher 17 through the intermediary of a suitable pin. In its new position, the magazine maintains the slide which has returned from the previewer in accurate alignment with the edge face 25 of the pusher 17.

It is further to be noted that, while the pusher 17 moves from the end position of FIG. 3, the inclined face 101 of its cam 100 moves away from the follower stud 102 on the upper arm 103 of the lifter 92 so that the latter rocks in a counterclockwise direction and its plunger 94 descends into the cutout 95. The spring 99 is then free to dissipate its energy and pushes a slide which was located between the guide rails 96, 97 back into the corresponding compartment 7. Return movement of a slide from the previewer is completed before the pusher 17 begins to move the magazine by a step so that the slide which returns from the previewer occupies the same compartment 7 as before.

If the operator decides not to show the next slide to his audience, i.e., to skip the slide which has just returned from the previewer, he simply depresses the push button 82 to thereby complete the circuit of the motor for the output shaft 53 (through the aforementioned third switch 89A which is connected in parallel with the switch 58 and with the aforementioned second switch). Depression of the push button 82 results in displacement of the slide member 77 which moves in a direction to the right and simultaneously turns in a counterclockwise direction. The slide member 77 ultimately assumes the position shown in FIG. 5 and is held in such position because the pin 80 enters the extension 86 of the guide slot 81. Such movement of the slide member 77 takes place against the bias of the spring 85.

If the push button 82 is depressed when the pusher 17 assumes its left-hand end position (in which it is ready to transport a slide into the projection gate PG), and if the operator thereupon depresses the handle 19 to move the pusher toward the end position of FIG. 3, the extension 84 of the motion transmitting member 70 strikes against the inclined face 109 of the slide member 77. This takes place before the edge 72 of the member 70 reaches the follower stud 71 on the shutter blade 66. The face 109 then pushes the member 70 against the bias of the spring 76 so that the member 70 moves upwardly and to such an extent that the edge 72 bypasses the follower stud 71 and the shutter blade 66 remains in closed position. In other words, the slide which has been transferred into the projection gate PG remains behind the closed shutter blade 66 and cannot be seen by the audience.

When the pusher 17 is reciprocated by means of the motor which drives the output shaft 53, the operator simply depresses the push button 13 to temporarily complete the circuit of the second switch which is connected in parallel with the switch 58. Therefore, the motor turns the shaft 53 whereby the trip 61 expels the pin 63 from the notch 62 so that the contact 59 cioses the switch 58 and the circuit of the motor remains completed even if the operator releases the push button 13. If the push button 13 is depressed when the crank arm 54 assumes the angular position of FIG. 3 in which the crank pin 55 registers with the slot 65 of the pusher 17 and rests against the springy brake 64, the pin 55 begins to shift the pusher 17 in a direction to the left in that it bears against the vertical edge 56. This moves a slide from the gate PG back into the magazine and ultimately results in stepwise advance of the magazine. During the second half of its revolution, the crank pin 55 engages the flange 57 and moves the pusher 17 back toward the end position of FIG. 3 by simultaneously advancing a second slide into the projection gate PG. The pin 55 engages the brake 64 as soon as it moves beyond the flange 57 and, at the same time, the pin 63 reenters the notch 62 of the trip 61 so that the switch 58 opens and deenergizes the circuit of the motor for the shaft 53.

If the just described operation is to remain hidden to the audience, the operator leaves the push button 13 alone and depresses the push button 82 instead. The trip 90 of the slide member 77 then closes the third switch 89A which bridges the switch 58 and also the aforementioned second switch to start the motor which drives the output shaft 53. The crank arm 54 again completes a full revolution and moves the pusher 17 away from and back to the end position of FIG. 3. The motion transmitting member 70 is held in raised position by the slide member 77 so that the shutter blade 66 remains closed and the slide which has been moved into the gate PG remains invisible to the audience.

Shortly before the crank pin 55 on the arm 54 moves beyond the bent-over flange 57 of the pusher 17, the pin 87 on the arm 88 of the output shaft 53 engages the edge face 89 of the slide member 77 and pushes the latter back to the position of FIG. 2 or 3. Thus, the motion transmitting member 70 is disengaged from the end portion 83 of the slide member 77 and the spring 76 is free to return the member 70 back to the lower end position in which the edge 72 is again in a position to engage the follower stud 71 and to rock the shutter blade 66. In the meantime, the pusher 17 already assumes the end position of FIG. 3 so that the edge 72 of the motion transmitting member 70 has moved beyond the follower stud 71. This stud 71 is then engaged by a face 110 of the member 70 but the shutter blade 66 remains in closed position. In the right-hand end position of the pusher 17, the crank pin 55 engages the brake 64 and the trip 90 of the slide member 77 (which has returned to its starting position) releases the switch 89A so that the switch 89A opens and deenergizes the circuit of the motor for the output shaft 53. At the start of the next slide transporting step, the motion transmitting member 70 moves away from the follower stud 71 and returns to its original position.

If the pusher 17 is to be reciprocated by means of the handle 19, the operator shifts the lever 91 to open the aforementioned interrupter switch. This opens the circuit of the motor for the output shaft 53 and such circuit remains open regardless of the condition of switches 58, 89A and/or the condition of the switch which is controlled by the push button 13. Such setting of the lever 91 insures that the operator can manipulate the push button 82 without the danger of accidentally starting the motor for the shaft 53.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a slide projector, a projection gate; a transfer unit for transporting slides between a magazine and said projection gate; a shutter movable between open and closed positions and normally assuming said closed position to blank the light beam from the viewing screen when there is no slide in said projection gate; motion transmitting means normally cooperating with said transfer unit for moving said shutter to open position in response to transfer of a slide into said projection gate; and control means for selectively idling said motion transmitting means so that the shutter remains in closed position while said transfer unit transports at least one slide into said projection gate.

2. A structure as set forth in claim 1, further comprising means for permanently biasing said shutter to closed position.

3. A structure as set forth in claim 1, wherein said transfer unit comprises a transfer member movable between two end positions and said motion transmitting means comprises a motion transmitting member provided on said transfer member and movable with respect thereto between first and second positions in one of which said motion transmitting member engages a portion of said shutter to move the latter to open position while said transfer member moves from the one to the other end position to thereby transport a slide from the magazine into said projection gate, said motion transmitting member being arranged to bypass said portion of the shutter when moved to the other of said first and second positions thereof, said control means comprising a device for moving said motion transmitting member to the other position at the will of the operator.

4. A structure as set forth in claim 3, further comprising means for biasing the motion transmitting member to said one position thereof.

5. A structure as set forth in claim 3, further comprising locking means for holding said motion transmitting member in the other position thereof.

6. A structure as set forth in claim 5, further comprising manually and motorically operated means for moving the transfer member between said end positions thereof and releasing means cooperating with said motorically operated means for disengaging said locking means in response to each transfer of a slide into said projection gate.

7. A structure as set forth in claim 3, wherein said device comprises a manually operable slide member which is movable into engagement with a portion of said motion transmitting member to thereby shift the latter to said other position.

8. A structure as set forth in claim 7, further comprising resilient means for permanently biasing said slide member away from engagement with said motion transmitting member.

9. A structure as set forth in claim 8, wherein said control means further comprises manually operated means for displacing said slide member against the bias of said resilient means and locking means for holding said slide member in a postion in which the slide member maintains the motion transmitting member in said other position thereof, said locking means comprising a guide pin and a slot provided on said slide member and having a locking portion dimensioned to receive said guide pin in response to manipulation of said manually operated means.

10. A structure as set forth in claim 1, further comprising a slide previewer and a second transfer unit for moving slides between the magazine and said previewer in response to transfer of slides between the magazine and said projection gate.

11. A structure as set forth in claim 10, further comprising advancing means for moving the magazine stepwise in response to operation of said first named transfer unit and on completed transfer of a slide from said projection gate back into the magazine, said first named transfer unit being arranged to transport slides which were returned into the magazine by said second transfer unit.

12. A structure as set forth in claim 11, wherein said transfer units are arranged to transport two immediately adjacent slides.

13. A structure as set forth in claim 1, wherein said shutter comprises a single blade and wherein said blade is rockable between said open and closed positions thereof.

14. A structure as set forth in claim 1, wherein said shutter is rockable about a fixed axis and wherein said motion transmitting means comprises a follower provided on said shutter and a motion transmitting member carried by said transfer unit and arranged to normally engage said follower and to thereby move the shutter to open position while the transfer unit is about to complete the transfer of a slide from the magazine into said projection gate.

15. A structure as set forth in claim 14, wherein said transfer unit comprises a reciprocable transfer member and said motion transmitting member is movable on said transfer member between a first and second position in which it respectively engages and bypasses said follower.

16. A structure as set forth in claim 15, further comprising resilient means for permanently biasing said shutter to closed position and for permanently biasing said motion transmitting member to said first position, said control means comprising a device for moving said motion transmitting member to second position at the will of the operator.

17. A structure as set forth in claim 16, wherein said transfer member is reciprocable in a substantially horizontal path and said motion transmitting member is reciprocable in a substantially vertical path.

18. A structure as set forth in claim 16, further comprising automatic means for disengaging said control means from said motion transmitting member in response to completed travel of said transfer member to one of two end positions thereof.

19. A structure as set forth in claim 18, wherein said control means comprises a manually operable member and a slide member controlled by said manually operable member and movable into and away from engagement with said motion transmitting member.

20. A structure as set forth in claim 19, wherein said projector further comprises a housing and wherein the magazine is movable by said transfer member in stepwise fashion in parallelism with the optical axis of the projector lens.

References Cited
UNITED STATES PATENTS

| | | | |
|---|---|---|---|
| 2,748,653 | 6/1956 | Pollan et al. | 88—27 |
| 3,336,836 | 8/1967 | Gould et al. | 40—79 X |

NORTON ANSHER, *Primary Examiner.*

ROBERT P. GREINER, *Assistant Examiner.*